US009194697B2

(12) United States Patent
Aoki

(10) Patent No.: US 9,194,697 B2
(45) Date of Patent: Nov. 24, 2015

(54) APPARATUS AND METHOD FOR MEASURING THREE-DIMENSIONAL OBJECTS

(71) Applicant: NIKON CORPORATION, Tokyo (JP)

(72) Inventor: Hiroshi Aoki, Yokohama (JP)

(73) Assignee: Nikon Corporation, Tokyo (JP)

( * ) Notice: Subject to any disclaimer, the term of this patent is extended or adjusted under 35 U.S.C. 154(b) by 311 days.

(21) Appl. No.: 13/680,861

(22) Filed: Nov. 19, 2012

(65) Prior Publication Data

US 2013/0076895 A1    Mar. 28, 2013

Related U.S. Application Data

(63) Continuation of application No. PCT/JP2011/002703, filed on May 16, 2011.

(30) Foreign Application Priority Data

May 19, 2010    (JP) .................................. 2010-115325

(51) Int. Cl.
*H04N 7/18*    (2006.01)
*G01B 11/25*   (2006.01)
*G01B 11/06*   (2006.01)

(52) U.S. Cl.
CPC ........ *G01B 11/2513* (2013.01); *G01B 11/0608* (2013.01); *H04N 7/18* (2013.01)

(58) Field of Classification Search
CPC ....... G01S 17/023; G01S 17/36; G01S 17/89; H04N 5/2256; H04N 7/18; A63B 2243/0045; G01B 11/0608; G01B 11/2513
USPC ....................................................... 348/136
See application file for complete search history.

(56) References Cited

U.S. PATENT DOCUMENTS 4,666,303 A * 5/1987 Pryor ............................ 356/606
4,736,214 A * 4/1988 Rogers ............................ 353/10

(Continued)

FOREIGN PATENT DOCUMENTS

JP    62-21011     1/1987
JP    5-340727     12/1993

(Continued)

OTHER PUBLICATIONS

JP2005214653AMT, Fuji et al, the English translation of the foreign document JP2005214653A can be generated from JPO Web Sites, 2005.*

(Continued)

*Primary Examiner* — Shan Elahi
(74) *Attorney, Agent, or Firm* — Finnegan, Henderson, Farabow, Garrett & Dunner, LLP

(57) ABSTRACT

There is provided a form measuring apparatus including: a projection section configured to project a plurality kinds of patterns onto a measuring object in sequence, the plurality kinds of patterns having a common repetitive structure and differing in phase; an imaging section configured to acquire an image data set by taking an image of the measuring object every time each of the plurality kinds of patterns is projected onto the measuring object; a selecting section configured to select a data set as an adequate data set from the acquired image data set, the data set concerning an identical area on the measuring object, and all data in the set falling within an effective brightness range; and a form calculating section configured to find a form of the area as a basis of acquiring the adequate data on the measuring object, based on the selected adequate data set.

16 Claims, 9 Drawing Sheets

(56) References Cited

U.S. PATENT DOCUMENTS

| | | | |
|---|---|---|---|
| 6,191,809 B1* | 2/2001 | Hori et al. ........................ | 348/45 |
| 6,711,283 B1* | 3/2004 | Soenksen ...................... | 382/133 |
| 6,839,144 B2 | 1/2005 | Okada et al. | |
| 8,244,023 B2* | 8/2012 | Yamada ........................ | 382/141 |
| 2004/0008894 A1* | 1/2004 | Zeineh .......................... | 382/240 |
| 2006/0109482 A1* | 5/2006 | Duval et al. ................... | 356/605 |
| 2006/0268254 A1* | 11/2006 | Percin et al. .................... | 355/69 |
| 2007/0177820 A1* | 8/2007 | O Ruanaidh et al. ......... | 382/294 |
| 2007/0269134 A1* | 11/2007 | Ruanaidh et al. ............. | 382/276 |
| 2010/0097439 A1* | 4/2010 | Kroll et al. ................. | 348/14.02 |
| 2011/0103679 A1* | 5/2011 | Campbell ..................... | 382/152 |
| 2012/0121158 A1* | 5/2012 | Sekine et al. ................. | 382/131 |

FOREIGN PATENT DOCUMENTS

| | | | |
|---|---|---|---|
| JP | 6-58726 | 3/1994 | |
| JP | 2002-357408 | 12/2002 | |
| JP | 2005-214653 | 8/2005 | |
| JP | 2005214653 A * | 8/2005 | ............ G01B 11/25 |
| JP | 2006-300539 | 11/2006 | |
| JP | 2006-527372 | 11/2006 | |
| JP | 2008-96117 | 4/2008 | |
| JP | 2008-281391 | 11/2008 | |
| TW | 200510690 | 3/2005 | |
| WO | WO 2004-109229 | 12/2004 | |

OTHER PUBLICATIONS

English-language International Preliminary Report on Patentability from the International Bureau of WIPO issued in International Application No. PCT/JP2011/002703, issued Nov. 20, 2012, 9 pages.

First Examination Report of Chinese Patent Application No. 2011800247329, issued by the State Intellectual Property Office of The People's Republic of China, dated Aug. 26, 2014, 25 pages.

English-language International Search Report from Japanese Patent Office for International Application No. PCT/JP2011/002703, mailed Jun. 7, 2011.

Second Office Action issued in Chinese Patent Application No. 201180024732.9, dated Jul. 10, 2015 (16 pages).

* cited by examiner

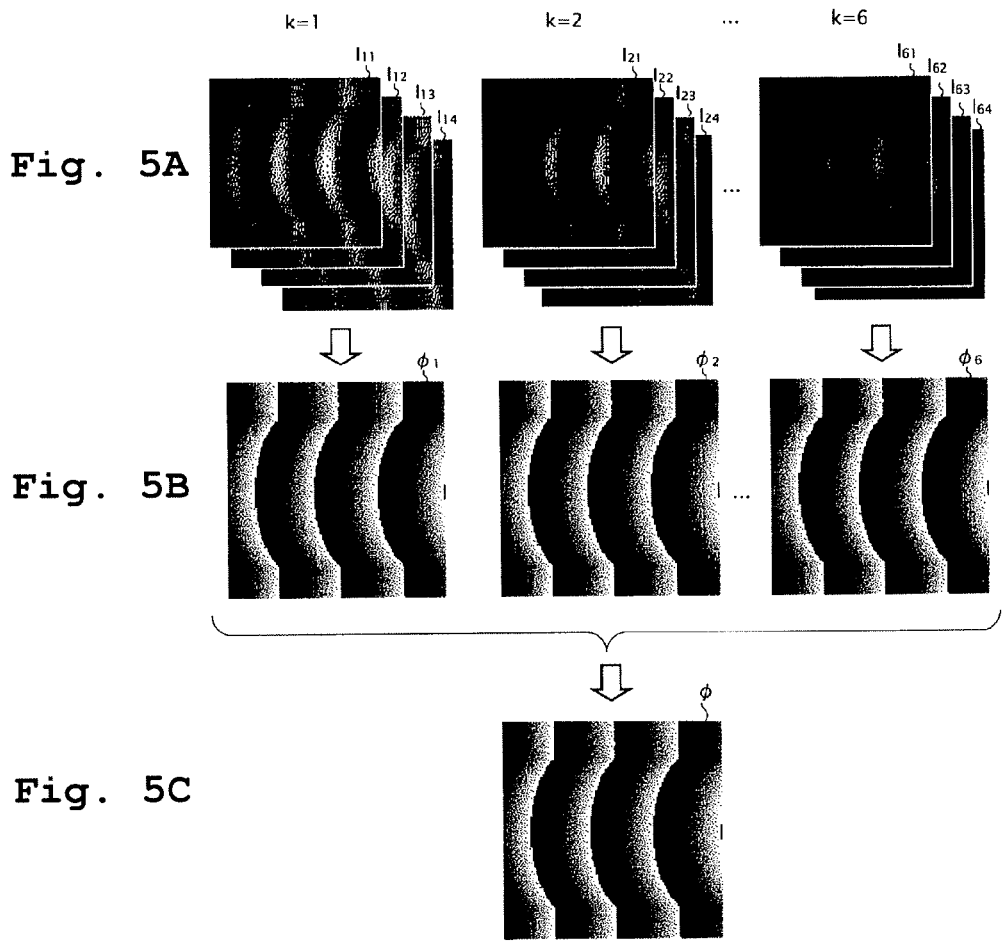
Fig. 5A
Fig. 5B
Fig. 5C
Fig. 6
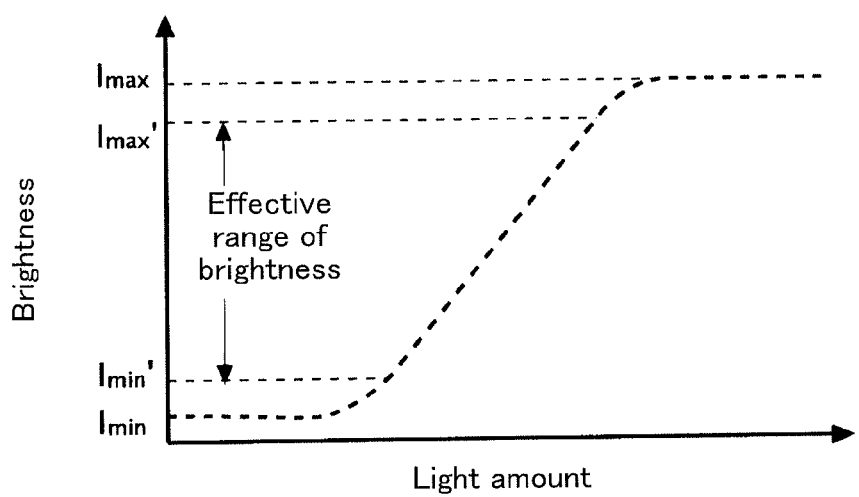

Fig. 10B

APPARATUS AND METHOD FOR MEASURING THREE-DIMENSIONAL OBJECTS

CROSS-REFERENCE TO RELATED APPLICATIONS

This is a Continuation Application of International Application No. PCT/JP2011/002703 filed on May 16, 2011 which claims priority to Japanese Patent Application No. 2010-115325 filed on May 19, 2010. The contents of the aforementioned applications are incorporated herein by reference in their entirety.

BACKGROUND

1. Field of the Invention

The present invention relates to a form measuring apparatus and a form measuring method which pertain to a pattern projection type based on a phase shifting technique.

2. Description of the Related Art

As a technique of measuring surface form of a measuring object (three-dimensional form) in a non-contact manner, there have been known three-dimensional form measuring apparatuses of a pattern projection type based on a phase shifting technique. Such a three-dimensional form measuring apparatus projects a fringe pattern having a sinusoidal intensity distribution onto a measuring object, and repeatedly takes an image of the measuring object while shifting the phase of the fringe pattern at a constant pitch. A phase distribution (phase image) of the fringe deformed according to the surface form of the measuring object is found or obtained by applying a plurality of images (brightness variation data) obtained in the above manner to a predetermined computational expression. Then the phase image is converted into a height distribution (height image) of the measuring object after unwrapping the phase image (phase unwrapping).

Incidentally, the three-dimensional shape measuring apparatus disclosed in Japanese Patent Application Laid-Open No. 2005-214653 acquires the brightness variation data under two capturing conditions different in projection light amount, evaluates the contrast values of two different brightness variation data according to each pixel, and excludes the brightness variation data with the lower contrast value from the computing objects in order to prevent measurement error due to saturated pixels.

SUMMARY

An aspect of the present invention provides a form measuring apparatus including: a projection section configured to project a plurality kinds of patterns onto a measuring object in sequence, the plurality kinds of patterns having a common repetitive structure and differing in phase;

an imaging section configured to acquire an image data set by taking an image of the measuring object every time each of the plurality kinds of patterns is projected onto the measuring object;

a selecting section configured to select a data set as an adequate data set from the acquired image data set, the data set concerning an identical area on the measuring object, and all data in the set falling within an effective brightness range; and a form calculating section configured to find a form of the area as a basis of acquiring the adequate data on the measuring object, based on the selected adequate data set.

BRIEF DESCRIPTION OF THE DRAWINGS

FIGS. 5A to 5C are diagrams for explaining an analysis flow according to a first embodiment;

FIG. 6 is a graph for explaining an effective brightness range;

FIGS. 10A and 10B are diagrams for explaining an analysis flow according to the second embodiment;

DESCRIPTION OF THE EMBODIMENTS

First Embodiment

Hereinafter, explanations will be given for a three-dimensional form measuring apparatus as a first embodiment of the present invention.

Figure 1:
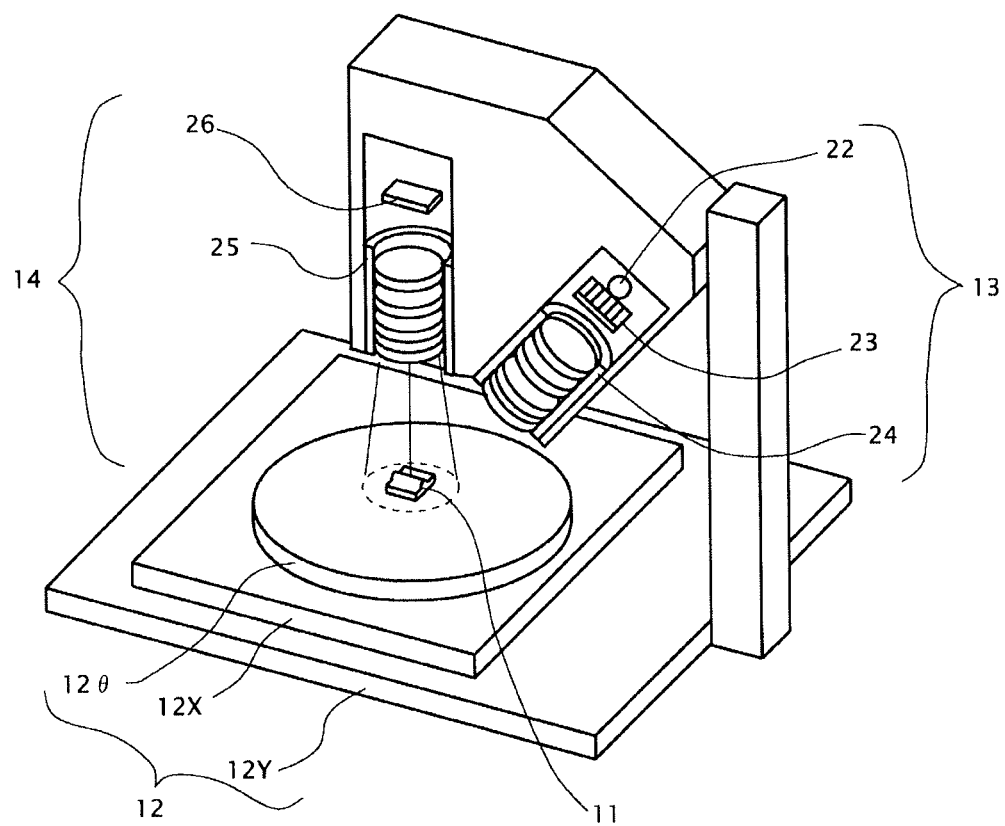
FIG. 1 is a perspective view of a three-dimensional form measuring apparatus.

FIG. 1 is a perspective view showing a mechanical construction of the three-dimensional form measuring apparatus according to the first embodiment. As shown in FIG. 1, the three-dimensional form measuring apparatus includes a stage 12 placing a measuring object 11 such as an industrial product, component or the like, and a projection section 13 and an imaging section 14 which are fixed with respect to each other. The projection section 13 and the imaging section are arranged so that there is an angle formed between the optical axis of the projection section 13 and the optical axis of the imaging section 14, and the two optical axes intersect at a reference surface of the stage 12. The optical axis of the imaging section 14 is vertical to the reference surface of the stage 12. Further, although it is also possible to let the optical axis of the projection section 13 be vertical thereto instead of the optical axis of the imaging section 14, it is supposed herein that the optical axis of the imaging section 14 is vertical thereto.

The stage 12 includes a θ-stage 12 θ rotating the measuring object 11 about an axis parallel to the optical axis of the imaging section 14, an X-stage 12X shifting the measuring object 11 toward a predetermined direction (X direction) orthogonal to the optical axis of the imaging section 14, and a Y-stage 12Y shifting the measuring object 11 toward another predetermined direction (Y direction) vertical to both the X direction and the rotation axis of the θ-stage 12 θ.

The projection section 13 is an optical system which illuminates a partial area of the stage 12 (illumination area) from an oblique direction with respect to the optical axis of the imaging section 14, and has an illumination element 22, a pattern forming section 23 and a projection optical system 24 arranged in the same order as described here. Further, the measuring object 11 of the first embodiment is supposed to have a size small enough to let the entire measuring object 11 fall within the illumination area of the projection section 13.

The pattern forming section 23 of the projection section 13 is a panel with a variable transmissivity distribution (such as a liquid crystal display device or the like), and forms a sinusoidal intensity distribution for a cross-section of the illumination light beam from the projection section 13 toward the illumination area by displaying a fringe pattern (sinusoidal grating pattern) on the panel. The grid-like bright and dark repetitive direction of the sinusoidal grating pattern displayed on the pattern forming section 23 is parallel to the surface with the presence of both the optical axis of the projection section 13 and the optical axis of the imaging section 14. Further, the pattern forming section 23 has a reference point which is positioned near the center of the display surface and is optically conjugate with the intersection between the optical axis of the imaging section 14 and the optical axis of the projection section 13. By virtue of this, the destination of projecting the sinusoidal grating pattern is set to be the surface of the measuring object 11 arranged within the illumination area of the stage 12 (to be referred to as "inspected surface" hereinafter). Further, as long as the sinusoidal grating pattern can be projected onto the inspected surface, then it is not necessary to maintain a complete conjugate relation between the reference point of the pattern forming section 23 and the reference point of the stage 12.

The imaging section 14 is an optical system which detects an image (brightness distribution) of the illumination area in the stage 12, and has arranged in order an imaging optical system 25 forming an image of the reflected light occurring in the illumination area, and an imaging element 26 capturing an image by taking another image of the image formed by the imaging optical system 25. The imaging element 26 has a reference point which is positioned near the center of the imaging surface and is optically conjugate with the intersection between the optical axis of the imaging section 14 and the optical axis of the projection section 13. Therefore, from above the stage 12, the imaging element 26 can take an image of the measuring object 11 (an image of the inspected surface) arranged within the illumination area for the projection section 13. Further, as long as the image of the inspected surface can be taken with sufficient contrast, then it is not necessary to maintain a complete conjugate relation between the reference point of the imaging element 26, and the intersection between the optical axis of the imaging section 14 and the optical axis of the projection section 13.

Then, when a light source (designated by the reference numeral 21 in FIG. 2) of the projection section 13 is turned on and the imaging element 26 is driven in this condition, then it is possible to take an image of the inspected surface with the projected sinusoidal grating pattern (=an image containing surface form information of the inspected surface). Hereinafter, this image will be referred to as "fringe image". Furthermore, when the fringe image is repeatedly taken while shifting the phase of the sinusoidal grating pattern without changing the period of the sinusoidal grating pattern, then information is sufficed for furnishing a known surface form data D for the inspected surface.

Further, the inspected surface can include various parts which are made of a high-reflectivity material such as a metal, and have different inclination angles. In such cases, when the inspected surface is viewed from the side of the imaging section 14, then in the inspected surface, there is some extremely bright part mixed with some extremely dark part. The extremely bright part is the part having such an inclination angle as to reflect a large part of the incident illumination light from the side of the projection section 13 (mainly the specular light) in directions oriented toward the imaging section 14, while the extremely dark part is the part having such an inclination angle as to reflect a large part of the irradiated illumination light from the side of the projection section 13 (mainly the specular light) in directions deviated from the imaging section 14.

Figure 2:
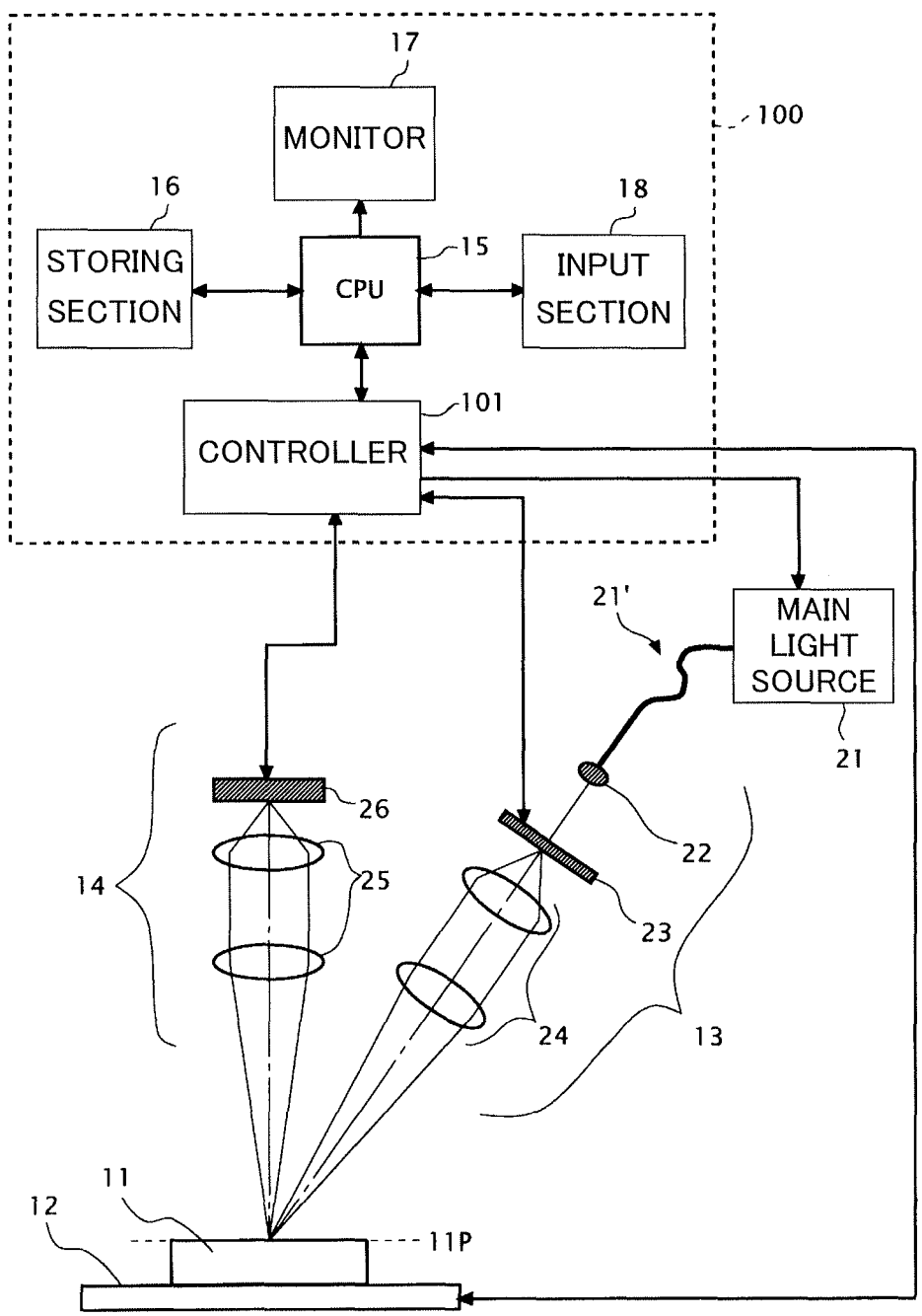
FIG. 2 is an overall configuration diagram of the three-dimensional form measuring apparatus.

FIG. 2 is an overall configuration diagram of the three-dimensional form measuring apparatus. In FIG. 2, the same reference numerals are assigned to the same elements as shown in FIG. 1. As shown in FIG. 2, the projection section 13 is linked with the main light source 21 which is the light source of the projection section 13. Because this main light source 21 is used for surface form measurement of pattern projection type, it is possible to adopt an ordinary light source such as LED, a halogen lamp, a metal halide lamp, a laser light source, and the like. The light emitted from the main light source 21 is introduced to the illumination element 22 through an optical fiber 21'. Further, while the optical fiber 21' is used here as an example, it is also possible to arrange a small light source such as LED and the like at the position designated by the reference numeral 22 in FIG. 1 without using an optical fiber.

The main light source 21, the pattern forming section 23 of the projection section 13, and the imaging element 26 of the imaging section 14 are connected to a controller 101 of a computer 100, respectively.

The controller 101 controls the timing of turning on or off the main light source 21, the light-emitting intensity of the main light source 21, the phase of the sinusoidal grating pattern displayed in the pattern forming section 23, the timing for the imaging element 26 to take an image, the time for charge accumulation when the imaging element 26 is taking an image (to be referred to as "shutter speed" hereinafter), the coordinates of the stage 12, and the like. Further, the controller 101 can also set a uniform pattern for display in the pattern forming section 23.

The computer 100 includes a CPU 15 entirely controlling the three-dimensional form measuring apparatus, a storage section 16, a monitor 17, and an input portion 18, other than the controller 101. The storage section 16 prestores an operating program for the CPU 15, and the CPU 15 operates according to this operating program. For example, the CPU 15 controls the driving of each part of the three-dimensional form measuring apparatus by giving various instructions to the controller 101. Further, the storage section 16 prestores not only the abovementioned operating program but also various kinds of information necessary for the CPU 15 to operate.

Figure 3:
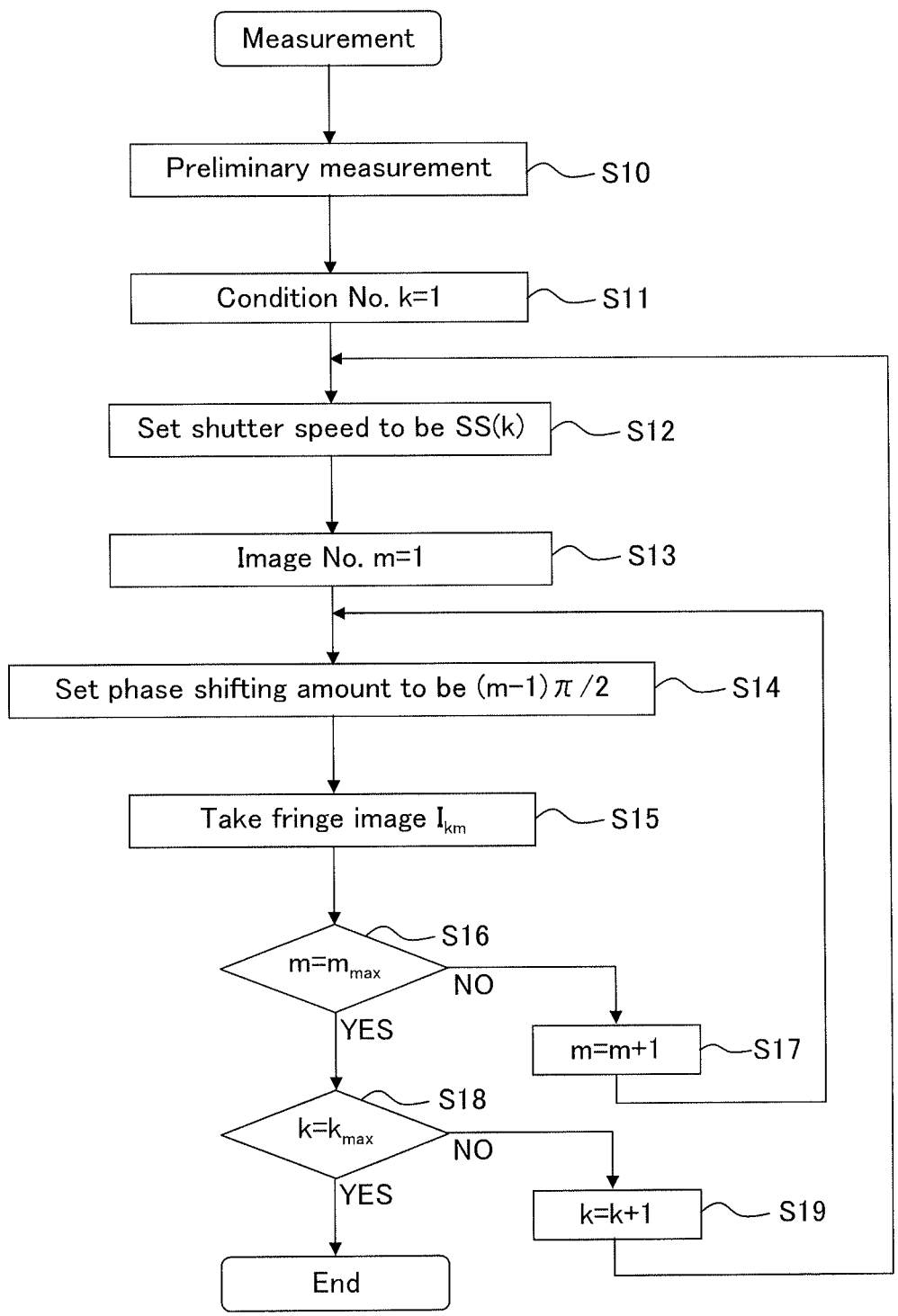
FIG. 3 is a flowchart of an operation of a CPU 15 (and a controller 101) with respect to measurement.

FIG. 3 is an operational flowchart of the CPU 15 (and the controller 101) with respect to measurement. Hereinafter, every step of FIG. 3 will be explained in order. Further, at the starting point of this flow, the coordinates of the stage 12 are supposed to have been adjusted to adaptive coordinates.

Step S10: The CPU 15 instructs the controller 101 to carry out a preliminary measurement. The controller 101 drives each part of the three-dimensional form measuring apparatus to carry out the preliminary measurement. In the preliminary measurement, the controller 101 sets the pattern for display in the pattern forming section 23 to be a bright uniform pattern (a uniform pattern with the same brightness as the bright part of the sinusoidal grating pattern), and repeatedly drives the imaging element 26 at various shutter speeds. A plurality of images taken in such a preliminary measurement are sent to the CPU 15 as the information indicating variation in the light amount reaching the imaging section 14 from the inspected surface. When $k_{max}$ kinds of different measuring conditions are determined by an aftermentioned determination method, then the CPU 15 gives information of those $k_{max}$ kinds of different measuring conditions and an instruction to start the measurement to the controller 101.

Here, suppose that all parameters except the shutter speed are common to the $k_{max}$ kinds of different measuring conditions, and a greater shutter speed (a greater exposure light amount) is set for the measuring condition with a smaller condition number k. Further, the final value $k_{max}$ of the condition number k should be preset by a user of the present apparatus or by the manufacturer of the present apparatus but, here, suppose that "6" has been set. Hereinafter, "SS(k)" will be used to denote the shutter speed of the measuring condition with the condition number k.

Step S11: The controller 101 sets the condition number k to be the initial value 1.

Step S12: The controller 101 sets the shutter speed of the imaging element 26 to be the shutter speed SS(k) corresponding to the current condition number k.

Step S13: The controller 101 sets the image number m to be the initial value 1.

Step S14: The controller 101 sets the phase shifting amount of the sinusoidal grating pattern to be the shifting amount $(m-1)\pi/2$ corresponding to the current image number m.

Step S15: When the light source device 21 is turned on to project the sinusoidal grating pattern with the phase shifting amount being $(m-1)\pi/2$ onto the measuring object 11, then the controller 101 drives the imaging element 26 at the current shutter speed SS(k) to take a fringe image $I_{km}$. The captured fringe image $I_{km}$ is then written into the storage section 16 via the CPU 15.

Step S16: The controller 101 determines whether or not the current image number m has reached the final value $m_{max}$; when it has not, then the process proceeds to Step S17, whereas when it has, then the process proceeds to Step S18. Further, it is assumed here to apply a 4-bucket method to an aftermentioned phase calculation, and it is supposed to set the final value $m_{max}$ of the image number m to be "4".

Step S17: The controller 101 returns the process to Step S14 after incrementing the image number m. Therefore, the loop of Steps S14 to S17 is repeated, and totally four fringe images (the fringe image set $I_{k1}$ to $I_{k4}$) are taken.

Step S18: The controller 101 determines whether or not the current condition number k has reached the final value $k_{max}$; when it has not, then the process proceeds to Step S19, whereas when it has, then the process of the flow is ended.

Step S19: The controller 101 returns the process to Step S12 after incrementing the condition number k. Therefore, the loop of Steps S12 to S19 is repeated, and totally six fringe image sets $I_{11}$ to $I_{14}$, $I_{21}$ to $I_{24}$, $I_{31}$ to $I_{34}$, $I_{41}$ to $I_{44}$, $I_{51}$ to $I_{54}$, and $I_{61}$ to $I_{64}$ are captured (see FIG. 5A).

Figure 4:
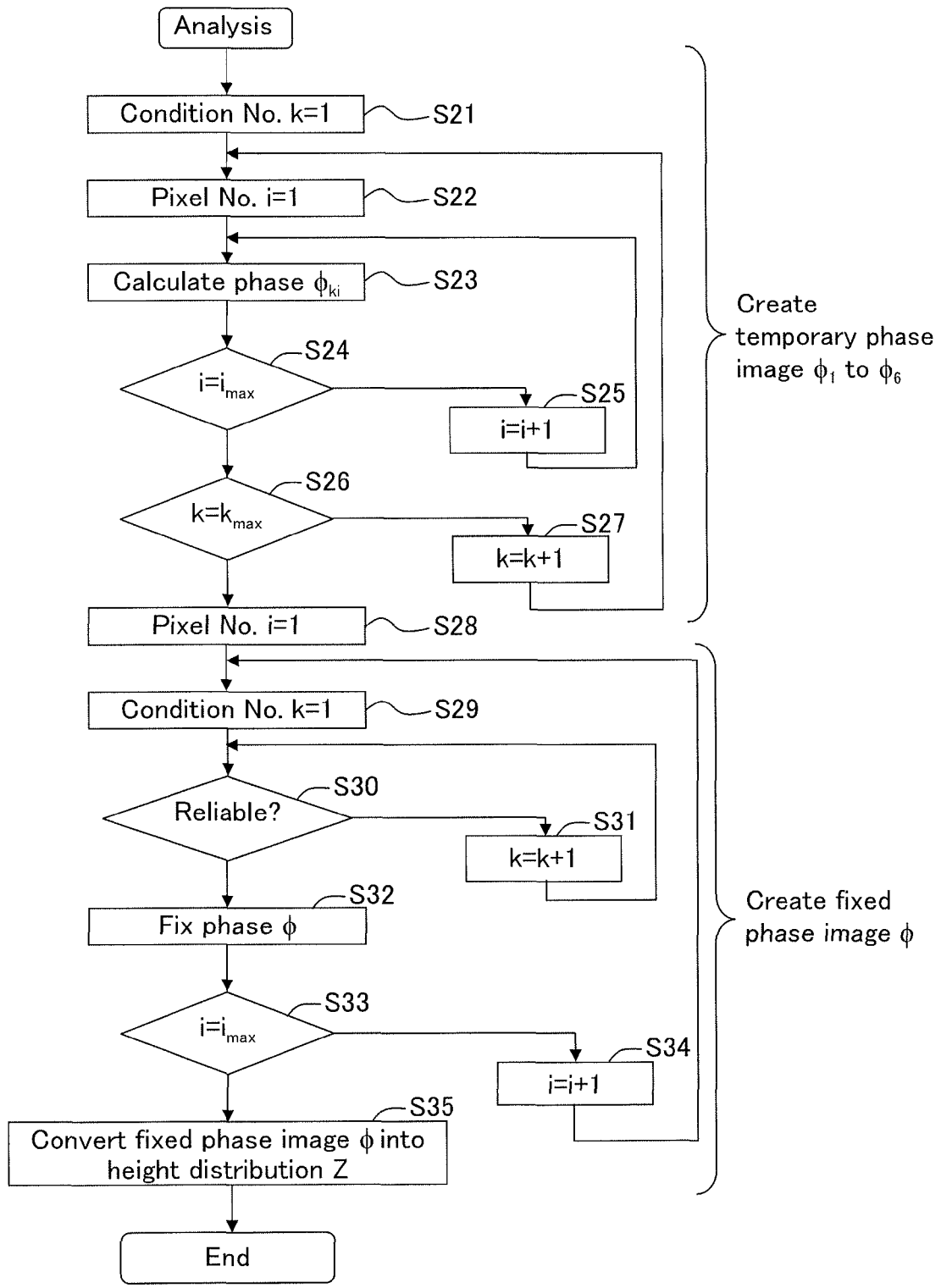
FIG. 4 is a flowchart of an operation of the CPU 15 with respect to analysis.

FIG. 4 is a flowchart showing an operation of the CPU 15 with respect to analysis. Hereinafter, every step of FIG. 4 will be explained in order. Further, at the starting point of this flow, it is supposed that the storage section 16 has already stored the six fringe image sets $I_{11}$ to $I_{14}$, $I_{21}$ to $I_{24}$, $I_{31}$ to $I_{34}$, $I_{41}$ to $I_{44}$, $I_{51}$ to $I_{54}$, and $I_{61}$ to $I_{64}$ (see FIG. 5A).

Step S21: The CPU 15 sets the condition number k to be the initial value 1.

Step S22: The CPU 15 sets the pixel number i to be the initial value 1.

Step S23: The CPU 15 refers to the pixel sets (brightness value sets $I_{k1i}$ to $I_{k4i}$) corresponding to the current pixel number i among the fringe image sets $I_{k1}$ to $I_{k4}$ corresponding to the current condition number k. Then, the CPU 15 calculates the initial phase $\phi_{ki}$ by applying the brightness value sets $I_{k1i}$ to $I_{k4i}$ to the following Equation (Eq. 1) of the 4-bucket method. Further, the CPU 15 writes the value of the initial phase $\phi_{ki}$ into the storage section 16 to store the same as the value of the i-th pixel $\phi_{ki}$ of a temporary phase image $\phi_k$ (see FIG. 5B) corresponding to the current condition number k.

[Eq. 1]

$$\phi_k = \tan^{-1} \frac{I_{k4} - I_{k2}}{I_{k1} - I_{k3}} \quad (1)$$

Step S24: The CPU 15 determines whether or not the current pixel number i has reached the final value $i_{max}$; when it has not, then the process proceeds to Step S25, whereas when it has, then the process proceeds to Step S26. Further, the final value $i_{max}$ of the pixel number i is set to correspond to the number of pixels of the imaging element 26.

Step S25: The CPU 15 returns the process to Step S23 after incrementing the pixel number i. Therefore, the loop of Steps S23 to S25 is repeated, and all pixels of the temporary phase image $\phi_k$ (see FIG. 5B) corresponding to the current condition number k are captured.

Step S26: The CPU 15 determines whether or not the current condition number k has reached the final value $k_{max}$ (which is 6 in this case); when it has not, then the process proceeds to Step S27, whereas when it has, then the process proceeds to Step S28.

Step S27: The CPU 15 returns the process to Step S22 after incrementing the condition number k. Therefore, the loop of Steps S22 to S27 is repeated, and totally six temporary phase images $\phi_1$, $\phi_2$, $\phi_3$, $\phi_4$, $\phi_5$, and $\phi_6$ are taken (see FIG. 5B).

Step S28: The CPU 15 sets the pixel number i to be the initial value 1.

Step S29: The CPU 15 sets the condition number k to be the initial value 1.

Step S30: The CPU 15 determines whether or not the pixel corresponding to the current pixel number i (initial phase $\phi_{ki}$) is reliable in the temporary phase image $\phi_k$ corresponding to the current condition number k; when it is not, then the process proceeds to Step S31, whereas when it is, then the process proceeds to Step S32.

Here, whether or not the initial phase $\phi_{ki}$ is reliable is determined by whether or not the brightness value sets ($I_{k1i}$ to $I_{k4i}$) are adequate to become the basis of calculating the initial phase $\phi_{ki}$, that is, whether or not the brightness value sets $I_{k1i}$ to $I_{k4i}$ have all fallen within an effective brightness range.

Further, the effective brightness range is, as shown in FIG. 6, the brightness range $I_{min}'$ to $I_{max}'$ such that the input and output characteristics of the imaging element 16 becomes linear over the entire output range of the imaging element 16 (the entire brightness range $I_{min}$ to $I_{max}$). This effective brightness range is measured in advance by the manufacturer of the present apparatus, and written into the storage section 16 in advance along with the aforementioned operating program.

Step S31: The CPU 15 returns the process to Step S30 after incrementing the condition number k. Therefore, the loop of Steps S30 and S31 is repeated until finding out a reliable pixel (initial phase $\phi_{ki}$).

Step S32: The CPU 15 writes the value of the initial phase $\phi_{ki}$ determined as reliable in Step S30 into the storage section 16 to store the same as the value of the ith pixel $\phi_i$ of a fixed phase image $\phi$ (see FIG. 5C).

Step S33: The CPU 15 determines whether or not the current pixel number i has reached the final value $i_{max}$; when it has not, then the process proceeds to Step S34, whereas when it has, then the process proceeds to Step S35.

Step S34: The CPU 15 returns the process to Step S29 after incrementing the pixel number i. Therefore, the loop of Steps S29 to S34 is repeated, and all pixels of the fixed phase image φ (see FIG. 5C) are acquired.

Figure 7:
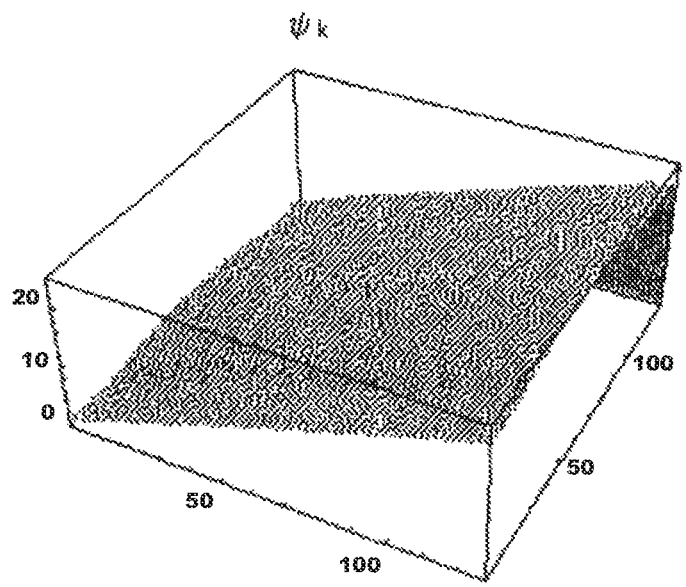
FIG. 7 shows an example of an unwrapped phase image $\Psi_k$.
Figure 8:
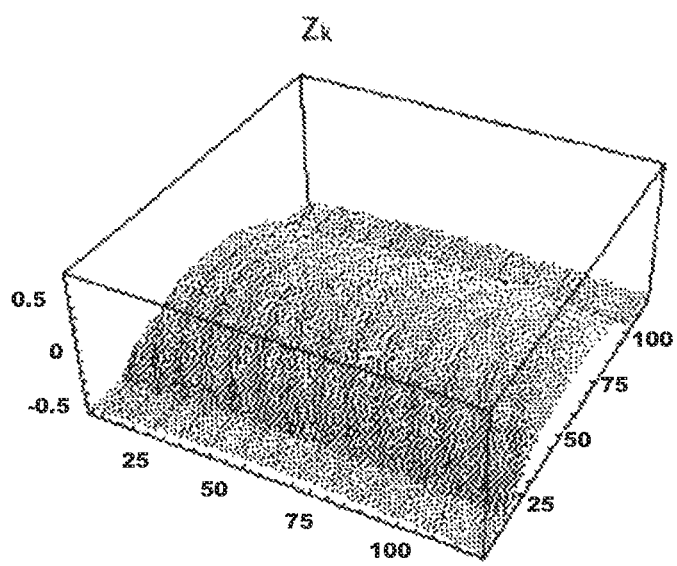
FIG. 8 shows an example of a height distribution $Z_k$.

Step S35: The CPU 15 reads out the fixed phase image φ from the storage section 16, carries out an unwrapping process (phase unwrapping) to add an offset distribution Δ to the fixed phase image φ, and acquires an unwrapped phase image Ψ (see FIG. 7). (Here, the offset distribution Δ is measured otherwise and prestored into the storage section 16, or set automatically by phase jump detection.) Further, the CPU 15 converts the unwrapped phase image Ψ (see FIG. 7) into a height distribution Z(X, Y) of the inspected surface (see FIG. 8), and then displays the converted result on the monitor 17. Further, the CPU 15 saves the height distribution Z(X, Y) into the storage section 16 as necessary, and ends the process of the flow (that is all there is to explain for FIG. 4).

In the above manner, the measuring apparatus of the first embodiment changes the shutter speed and, meanwhile, repeats the process six times (Steps S11 to S19) to acquire the brightness variation data of each pixel (the brightness value sets $I_{k1i}$ to $I_{k4i}$), thereby acquiring six brightness value sets: $I_{11i}$ to $I_{14i}$, $I_{21i}$ to $I_{24i}$, $I_{31i}$ to $I_{34i}$, $I_{41i}$ to $I_{44i}$, $I_{51i}$ to $I_{54i}$, and $I_{61i}$ to $I_{64i}$. Then, from the six brightness value sets $I_{11i}$ to $I_{14i}$, $I_{21i}$ to $I_{24i}$, $I_{31i}$ to $I_{34i}$, $I_{41i}$ to $I_{44i}$, $I_{51i}$ to $I_{54i}$, and $I_{61i}$ to $I_{64i}$, the CPU 15 selects an adequate brightness value set to calculate the height distribution Z(X, Y) (Steps S28 to S35).

Therefore, even when the inspected surface has some extremely bright part mixed with some extremely dark part, the measuring apparatus of the first embodiment can still carry out the measurement with a high degree of accuracy.

Moreover, since the measuring apparatus of the first embodiment prestores the effective brightness range which is an output range over which the input and output characteristics of the imaging element 26 becomes linear (see FIG. 6), therefore in the selection, any brightness value set within the effective brightness range is regarded as an adequate brightness value set among the six brightness value sets $I_{11i}$ to $I_{14i}$, $I_{21i}$ to $I_{24i}$, $I_{31i}$ to $I_{34i}$, $I_{41i}$ to $I_{44i}$, $I_{51i}$ to $I_{54i}$, and $I_{61i}$ to $I_{64i}$.

Here, because an ordinary phase computation formula, such as that applying the 4-bucket method (Eq. 1) or the like, utilizes the relationship between the respective buckets in phasing shifting, there is a fear to cause a significant increase in computation error when the relationship between the respective buckets is inaccurate.

However, in the first embodiment, since any brightness value set regarded as adequate is a brightness value set within the effective brightness range shown in FIG. 6 (within the range of linear input and output characteristics), therefore it correctly reflects the relationship between the respective buckets in phase shifting.

Therefore, with the measuring apparatus of the first embodiment, it is possible to reliably increase the accuracy in phase computation.

Further, the measuring apparatus of the first embodiment determines whether or not a brightness value set is adequate in descending order of the shutter speed (the exposure light amount). Hence, supposing there are a plurality of adequate brightness value sets, it is configured to select the set with the greatest shutter speed (the greatest exposure light amount) from these plurality of brightness value sets.

Therefore, with the measuring apparatus of the first embodiment, the accuracy in phase computation is further increased by preferentially using the brightness value set with a better SN ratio.

Second Embodiment

Hereinafter, a second embodiment of the present invention will be explained. Here, only the aspects different from those of the first embodiment will be explained. The aspects different from those of the first embodiment reside in the operation of the CPU 15 with respect to analysis.

Figure 9:
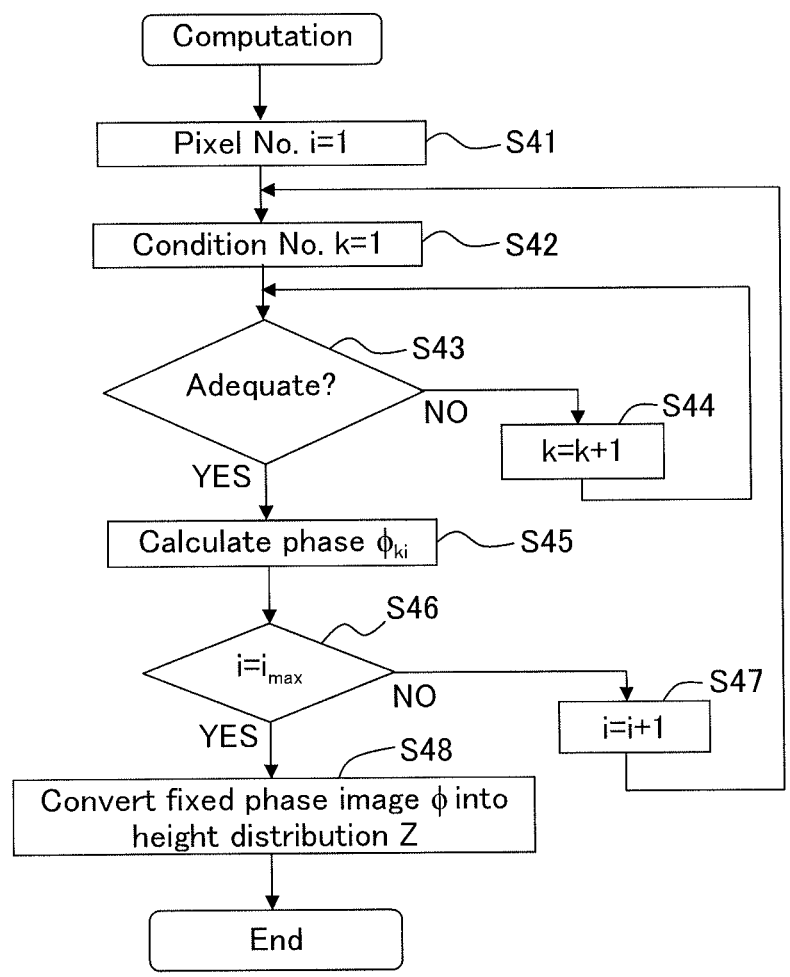
FIG. 9 is an operational flowchart of the CPU 15 with respect to analysis according to a second embodiment.
Figure 10A:
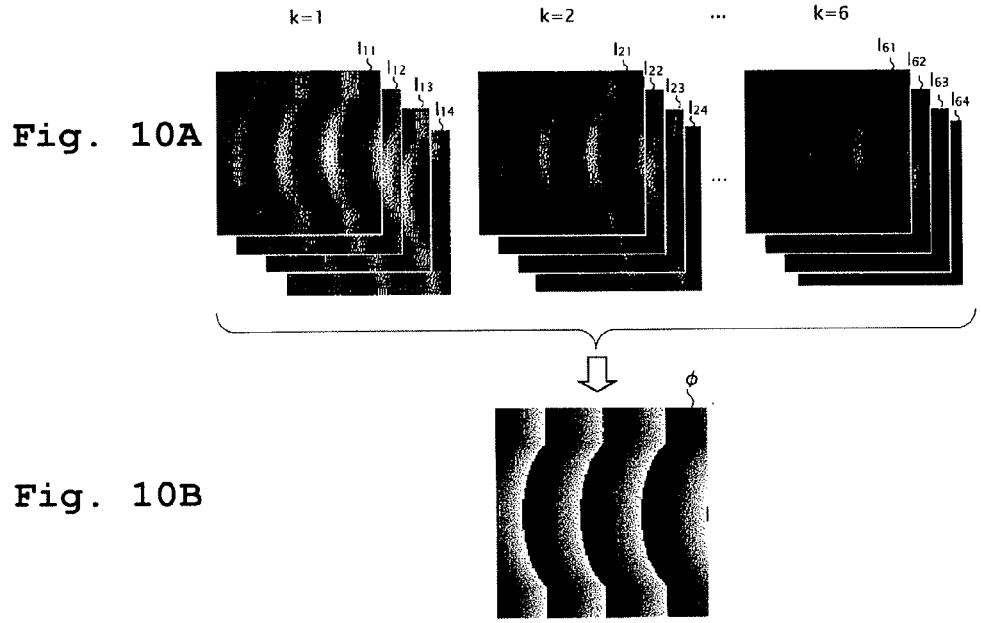

FIG. 9 is a flowchart of an operation of the CPU 15 with respect to analysis according to the second embodiment. Hereinafter, every step of FIG. 9 will be explained in order. Further, at the starting point of this flow, it is supposed that the storage section 16 has already stored the six fringe image sets $I_{11}$ to $I_{14}$, $I_{21}$ to $I_{24}$, $I_{31}$ to $I_{34}$, $I_{41}$ to $I_{44}$, $I_{51}$ to $I_{54}$, and $I_{61}$ to $I_{64}$ (see FIG. 10A).

Step S41: The CPU 15 sets the pixel number i to be the initial value 1.

Step S42: The CPU 15 sets the condition number k to be the initial value 1.

Step S43: The CPU 15 refers to the pixel sets (the brightness value sets $I_{k1i}$ to $I_{k4i}$) corresponding to the current pixel number i among the fringe image sets $I_{k1}$ to $I_{k4}$ corresponding to the current condition number k. Then, the CPU 15 determines whether or not those brightness value sets $I_{k1i}$ to $I_{k4i}$ are adequate; when they are not, then the process proceeds to Step S44, whereas when they are, then the process proceeds to Step S45.

Here, whether or not the brightness value sets $I_{k1i}$ to $I_{k4i}$ are adequate is determined by whether or not the brightness value sets $I_{k1i}$ to $I_{k4i}$ have all fallen within an effective brightness range. This effective brightness range is the same as that used in Step S30 described hereinbefore. It is also measured in advance by the manufacturer of the present apparatus, and written into the storage section 16 in advance along with the aforementioned operating program.

Step S44: The CPU 15 returns the process to Step S43 after incrementing the condition number k. Therefore, the loop of Steps S43 and S44 is repeated until finding out an adequate brightness value set.

Step S45: The CPU 15 calculates the initial phase $φ_{ki}$ by applying the brightness value sets $I_{k1i}$ to $I_{k4i}$ determined as adequate in Step S43 to the Formula (Eq. 1) of the 4-bucket method. Then, the CPU 15 writes the value of the initial phase $ψ_{ki}$ into the storage section 16 to store the same as the value of the i-th pixel $φ_i$ of the fixed phase image φ (see FIG. 10B).

Step S46: The CPU 15 determines whether or not the current pixel number i has reached the final value $i_{max}$; when it has not, then the process proceeds to Step S47, whereas when it has, then the process proceeds to Step S48. Further, the final value $i_{max}$ of the pixel number i is set to correspond to the number of pixels of the imaging element 26.

Step S47: The CPU 15 returns the process to Step S42 after incrementing the pixel number i. Therefore, the loop of Steps S42 to S47 is repeated, and all pixels of the fixed phase image φ (see FIG. 10B) are acquired.

Step S48: The CPU 15 reads out the fixed phase image φ from the storage section 16, carries out an unwrapping process (phase unwrapping) to add an offset distribution Δ to the fixed phase image φ, and acquires an unwrapped phase image Ψ (see FIG. 7). (Here, the offset distribution Δ is measured otherwise and prestored into the storage section 16, or set automatically by phase jump detection.) Further, the CPU 15 converts the unwrapped phase image Ψ (see FIG. 7) into a height distribution Z(X, Y) of the inspected surface (see FIG. 8), and then displays the converted result on the monitor 17. Further, the CPU 15 saves the height distribution Z(X, Y) into the storage section 16 as necessary, and ends the process of the flow (that is all there is to explain for FIG. 9).

In the above manner, the measuring apparatus of the second embodiment also prestores the effective brightness range which is an output range over which the input and output characteristics of the imaging element 26 becomes linear (see FIG. 6), and selects a brightness value set within the effective brightness range as an adequate brightness value set among the six brightness value sets $I_{11i}$ to $I_{14i}$, $I_{21i}$ to $I_{24i}$, $I_{31i}$ to $I_{34i}$, $I_{41i}$ to $I_{44i}$, $I_{51i}$ to $I_{54i}$, and $I_{61i}$ to $I_{64i}$.

Therefore, with the measuring apparatus of the second embodiment, it is possible to reliably increase the accuracy in phase computation.

Moreover, because the measuring apparatus of the second embodiment creates the fixed phase image after completing the selection of the brightness value set without acquiring the temporary phase image, it is possible to take only the selected brightness value set as the phase computing object, thereby making it possible to greatly reduce the load on phase computation.

Method for Determining Measuring Conditions

Hereinafter, explanation will be given for a method of determining the aforementioned $k_{max}$ kinds of different measuring conditions (i.e. $k_{max}$ kinds of different shutter speeds in the case here).

Figure 11:
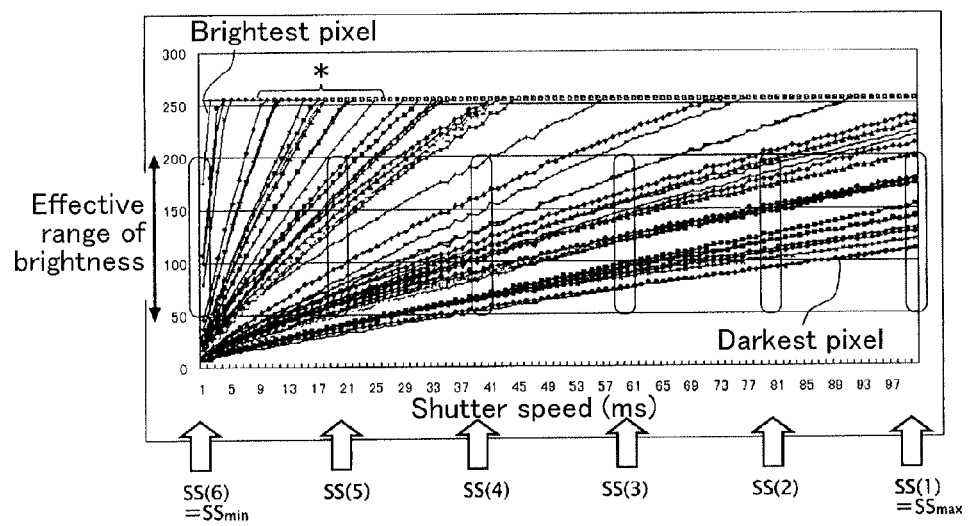
FIG. 11 shows characteristic curves indicating a relationship between shutter speed and brightness value.

FIG. 11 shows characteristic curves indicating a relationship between shutter speed and brightness value. Further, the data shown in FIG. 11 is the inherent data in the association between the measuring object 11 and the imaging element 26, e.g., the data acquired in the aforementioned preliminary measurement and the like.

The plurality of characteristic curves shown in FIG. 11 are characteristic curves concerning the pixels corresponding to the parts different in brightness from each other in the inspected surface. As shown in FIG. 11, the characteristic curves generally have higher gradients for pixels corresponding to the bright part in the inspected surface (bright pixels). The characteristic curve with the lowest gradient in FIG. 11 is the characteristic curve of the pixel corresponding to the darkest part in the inspected surface (the darkest pixel), while the characteristic curve with the highest gradient is the characteristic curve of the pixel corresponding to the brightest part in the inspected surface (the brightest pixel).

Further, in order to make it easy to understand here, the effective brightness range is supposed to be a narrow brightness range from 50 to 200; the term "effective pixel" refers to a pixel outputting a brightness value within this effective brightness range; and the term "ineffective pixel" refers to a pixel outputting a brightness value out of this effective brightness range.

First, an explanation will be given for the method of setting a variation range for the shutter speed.

The upper limit value $SS_{max}$ of a variation range of the shutter speed is set to be a value such that the darkest pixel can be an effective pixel when the shutter speed is $SS_{max}$ (a value such that the characteristic curve of the darkest pixel can fall within an elliptical frame). Here, as shown in FIG. 11, suppose that the upper limit value $SS_{max}$ is set to be 100 ms.

On the other hand, the lower limit value $SS_{min}$ of the variation range of the shutter speed is set to be a value such that the brightest pixel can be an effective pixel when the shutter speed is $SS_{min}$ (a value such that the characteristic curve of the brightest pixel can fall within an elliptical frame). Here, as shown in FIG. 11, suppose that the lower limit value $SS_{min}$ is set to be 1 ms.

Next, an explanation will be given for the method of setting a changing pitch $\Delta$ of the shutter speed.

When the changing pitch $\Delta$ should be made constant, then it can be set according to the following Formula (Eq. 2).

[Eq. 2]

$$\Delta = \frac{SS_{max} - SS_{min}}{k_{max} - 1} \quad (2)$$

Therefore, when $SS_{max}$=100 ms and $SS_{min}$=1 ms, then $\Delta$=19.8 ms.

Then, the k-th shutter speed SS(k) can be set according to the following Formula (Eq. 3).

[Eq. 3]

$$SS(k) = _{max} - \Delta*(k-1) \quad (3)$$

Therefore, when $SS_{max}$=100 ms, $SS_{min}$=1 ms, and $\Delta$=19.8 ms, then as shown in FIG. 11, SS(1)=100 ms, SS(2)=80.2 ms, SS(3)=60.4 ms, SS(4)=40.6 ms, SS(5)=20.8 ms, and SS(6)=1 ms.

Accordingly, when the shutter speed is shifted by one step from SS(1) toward SS(6), then at first only those comparatively dark pixels become the effective pixels (the pixels whose characteristic curves fall within an elliptical frame), but gradually bright pixels begin to become the effective pixels, and finally only the extremely bright pixels become the effective pixels.

However, when the changing pitch $\Delta$ is constant as above, then it is possible to bring about some pixels which cannot become the effective pixels (pixels of which characteristic curves do not fall within any elliptical frame) no matter which step the shutter speed is set at. In particular, since comparatively bright pixels have higher-gradient characteristic curves, when the shutter speed is shifted from SS(5) to SS(6) for example, then among the comparative bright pixels, there are pixels which cannot become the effective pixels (pixels of which characteristic curves cannot fall within any elliptical frame) both before and after the shifting (see the part designated by the asterisk mark * in FIG. 11).

Hence, in the second embodiment, it is possible not to set a constant changing pitch $\Delta$ for the shutter speed, but to set a narrower changing pitch $\Delta$ for the shutter speed as the shutter speed is slower. In order to realize this, for example, instead of setting a constant changing pitch $\Delta$ for the shutter speed, a constant changing pitch $\Delta'$ on a logarithmic scale can be set for the shutter speed.

Figure 12:
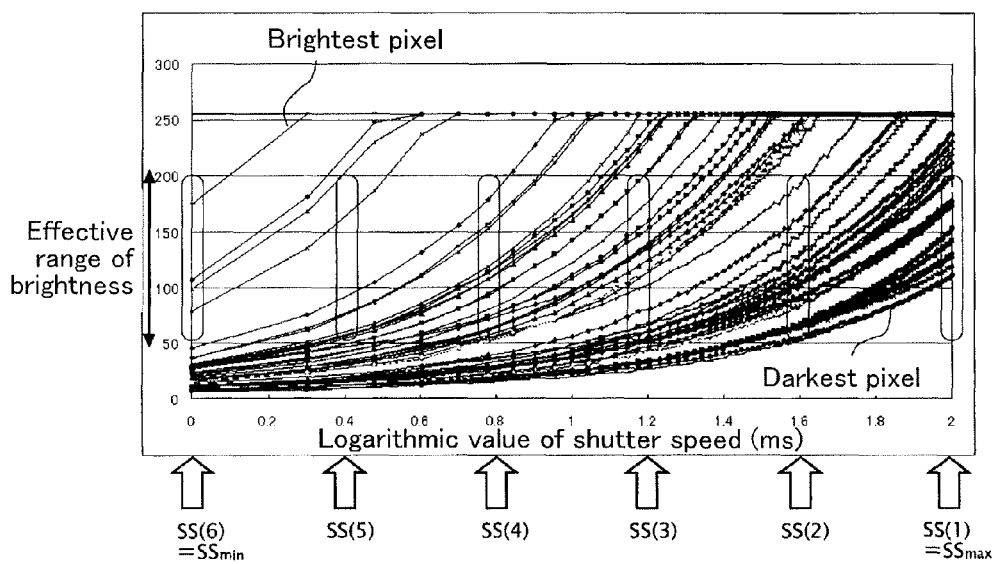
FIG. 12 shows the characteristic curves with the horizontal axis of FIG. 11 (the shutter speed) on a logarithmic scale.

FIG. 12 shows the characteristic curves with the horizontal axis of FIG. 11 (the shutter speed) on a logarithmic scale. In the second embodiment, the shutter speeds SS(1) to SS(6) are set equidistantly on this logarithmic scale.

In this case, the variation pitch $\Delta'$ on the logarithmic scale can be set for the shutter speed according to the following Formula (Eq. 4).

[Eq. 4]

$$\Delta' = \frac{\text{Log}_{10}(SS_{max}) - \text{Log}_{10}(SS_{min})}{k_{max} - 1} \quad (4)$$

Therefore, when $SS_{max}$=100 ms and $SS_{min}$=1 ms, then $\Delta' \cong 0.4$.

Then, the k-th shutter speed SS(k) can be set according to the following Formula (Eq. 5).

[Eq. 5]

$$SS(k) = 10^{\wedge}(\text{Log}_{10}(SS_{max}) - \Delta'*(k-1)) \quad (5)$$

Therefore, if $SS_{max}$=100 ms, $SS_{min}$=1 ms, and $\Delta'\cong 0.4$, then SS(1)=100 ms, SS(2)≅39.8 ms, SS(3)≅15.8 ms, SS(4)≅6.3 ms, SS(5)≅2.5 ms, and SS(6)=1 ms.

In this manner, a narrower changing pitch $\Delta$ is set for the shutter speed as the shutter speed is slower. In this case, it is possible to reduce the number of the pixels which cannot become the effective pixels (designated by the asterisk mark * in FIG. 11). Incidentally, in the example of FIG. 12, the number of the pixels which cannot become the effective pixels is zero.

Further, although the base of the logarithm used here is "10", it is needless to say that other bases are equally applicable.

Supplement to the Embodiments

Further, in the above embodiments, the shutter speed of the imaging element 26 is changed to bring in distinction for the exposure light amount with the $k_{max}$ kinds of different measuring conditions. However, it is also possible to change the aperture value of the stop (aperture stop) arranged in any optical path from the light source to the imaging element. Alternatively, it is also possible to change the light source power of the projection section 13. Still alternatively, it is also possible to change the transmissivity of any optical path from the light source to the imaging element (in this case, it is possible to install a plurality of filters different in transmissivity, and use a mechanism capable of selectively inserting one of those filters into the optical path).

Further, as the phase shifting technique of the above embodiments, the 4-bucket method is adopted wherein the number of fringe images needed for calculating the initial phase is four. However, it is also possible to adopt other phase shifting techniques such as a 3-bucket method wherein the number is three, a 7-bucket method wherein the number is seven, and the like.

Further, in the above embodiments, it is configured to acquire a plurality of fringe image sets with a plurality of different exposure light amounts, carry out the process of selecting an adequate brightness value set from those plurality of fringe image sets according to each area on the measuring object, and calculate the initial phase data (and the height data) of each area based on the adequate brightness value set of each area. However, this configuration can be modified as follows.

That is, a modification to the above embodiments is configured to capture one fringe image set with one exposure light amount, select the brightness value set of an area on the measuring object with the adequate exposure light amount (i.e. the brightness value set such that all brightness values in the set fall within the effective brightness range) from that fringe image set, and calculate the initial phase data (and the height data) of that area on the measuring object based on the selected brightness value set.

Further, in the above embodiments, a sinusoidal grating pattern is used as the pattern for projection onto a measuring object. However, it is also possible to use any pattern with a repetitive structure other than the sinusoidal grating pattern.

Further, the program stored in the storage section 16 of the above embodiments can alternatively be a firmware program updated through upgrade and the like. That is, it is also possible to provide the analysis processes of the above embodiments (FIGS. 4 and 9) by updating the firmware program of an existing analysis process.

Further, in the above embodiments, the analysis processes (FIGS. 4 and 9) are realized entirely with a CPU by way of software. However, it is also possible to realize the analysis processes (FIGS. 4 and 9) entirely or partially with an ASIC by way of hardware.

What is claimed is:

1. A form measuring apparatus comprising:
a projector configured to project a plurality kinds of patterns onto a measuring object in sequence, the plurality kinds of patterns having a common repetitive structure and differing in phase;
an imager configured to acquire an image data set by taking an image of the measuring object at each of the plurality kinds of patterns projected onto the measuring object;
a selector configured to select a data set as an adequate data set from the acquired image data sets, the data set concerning an identical area on the measuring object, and all data in the set falling within an effective brightness range over which the imager has linear input and output characteristics; and
a form calculator configured to calculate a form of the area of acquiring the adequate data on the measuring object, based on the selected adequate data set.

2. The form measuring apparatus according to claim 1, further comprising a controller configured to acquire the image data set including a plurality of image data sets by causing the imager to acquire the image data set with each of a plurality of different exposure light amounts, wherein the selector carries out a process in each area on the measuring object to select the adequate data set from the plurality of image data sets.

3. The form measuring apparatus according to claim 2, wherein the selector selects a data set as the adequate data set from the plurality of image data sets, the data set being such that a brightness value of the data set falls within the effective brightness range over which the imager has linear input and output characteristics.

4. The form measuring apparatus according to claim 3, wherein the selector selects a data set as the adequate data set from the plurality of image data sets, the data set being such that a brightness value of the data set falls within the effective brightness range, and an exposure light amount of the data set is the greatest among data sets of which brightness value fall within the effective brightness range.

5. The form measuring apparatus according to claim 2, wherein the controller sets narrower pitches between the plurality of different exposure light amounts as the exposure light amounts become smaller.

6. The form measuring apparatus according to claim 5, wherein the controller sets equidistant pitches between the plurality of different exposure light amounts on a logarithmic scale of the exposure light amounts.

7. The form measuring apparatus according to claim 2, wherein the controller is configured to set a value range for the plurality of different exposure light amounts before acquiring the plurality of image data sets; and the controller is configured to set an upper limit value for the value range of the exposure light amounts to be such a value that the data of the darkest part on the measuring object falls within the effective brightness range, and a lower limit value for the value range of the exposure light amounts to be such a value that the data of the brightest part on the measuring object falls within the effective brightness range.

8. The form measuring apparatus according to claim 2, wherein the controller sets the plurality of different exposure light amounts by changing a charge accumulating time of the imager.

9. A form measuring method comprising:
projecting a plurality kinds of patterns onto a measuring object in sequence, the plurality kinds of patterns having a common repetitive structure and differing in phase;
acquiring an image data set by taking an image of the measuring object at each of the plurality kinds of patterns projected onto the measuring object;
selecting a data set as an adequate data set, the data set concerning an identical area on the measuring object, and all data in the set falling within an effective brightness range over which an imager acquiring the image data set has linear input and output characteristics; and
calculating a form of the area as a basis of acquiring the adequate data on the measuring object, based on the selected adequate data set.

10. The form measuring method according to claim 9, further comprising: acquiring a plurality of image data sets by acquiring the image data set with each of a plurality of different exposure light amounts,
wherein when selecting the adequate data set, a process is carried out in each area on the measuring object to select the adequate data set from the plurality of image data sets.

11. The form measuring method according to claim 10, wherein when selecting the adequate data set, a data set is selected as the adequate data set from the plurality of image data sets, the data set being such that a brightness value of the data set falls within the effective brightness range over which the imager has linear input and output characteristics.

12. The form measuring method according to claim 10, wherein when selecting the adequate data set, a data set is selected as the adequate data set from the plurality of image data sets, the data set being such that a brightness value of the data set falls within the effective brightness range, and an exposure light amount of the data set is the greatest among data sets of which brightness value fall within the effective brightness range.

13. The form measuring method according to claim 10, wherein when acquiring the image data set including the plurality of image data sets, narrower pitches between the plurality of different exposure light amounts are set as the exposure light amounts become smaller.

14. The form measuring method according to claim 13, wherein when acquiring the image data set including the plurality of image data sets, equidistant pitches between the plurality of different exposure light amounts are set on a logarithmic scale of the exposure light amounts.

15. The form measuring method according to claim 10, wherein acquiring the image data set including the plurality of image data sets includes the step of: setting a value range for the plurality of different exposure light amounts before acquiring the plurality of image data sets; and
when setting the value range, an upper limit value for the value range of the exposure light amounts is set to be such a value that the data of the darkest part on the measuring object falls within the effective brightness range, and a lower limit value for the value range of the exposure light amounts is set to be such a value that the data of the brightest part on the measuring object falls within the effective brightness range.

16. The form measuring method according to claim 10, wherein when acquiring the image data set including the plurality of image data sets, the plurality of different exposure light amounts are set by changing a charge accumulating time during acquiring the image data set by taking the image of the measuring object.

* * * * *